(12) United States Patent
Wu et al.

(10) Patent No.: US 12,507,712 B2
(45) Date of Patent: Dec. 30, 2025

(54) GELATIN COMPOSITION, A PROCESS FOR MAKING SUCH AND USES THEREOF

(71) Applicant: Tessenderlo Group NV, Brussels (BE)

(72) Inventors: Yingying Wu, Ertvelde (BE); Milagros Patrizi, Brussels (BE); Jan Otterpohl, Nienborg (DE); Erwin Theo Maria Quanten, Herent (BE)

(73) Assignee: TESSENDERLO GROUP NV, Brussels (BE)

( * ) Notice: Subject to any disclaimer, the term of this patent is extended or adjusted under 35 U.S.C. 154(b) by 557 days.

(21) Appl. No.: 17/830,413

(22) PCT Filed: Dec. 2, 2020

(86) PCT No.: PCT/EP2020/084236
§ 371 (c)(1),
(2) Date: Jun. 2, 2022

(87) PCT Pub. No.: WO2021/110729
PCT Pub. Date: Jun. 10, 2021

(65) Prior Publication Data
US 2023/0157314 A1 May 25, 2023

(30) Foreign Application Priority Data
Dec. 2, 2019 (EP) .................................... 19213007

(51) Int. Cl.
| | | |
|---|---|---|
| *A23J 3/06* | (2006.01) | |
| *A23G 3/44* | (2006.01) | |
| *A23J 3/34* | (2006.01) | |
| *A23K 20/147* | (2016.01) | |
| *A23K 50/40* | (2016.01) | |
| *A23L 29/281* | (2016.01) | |

(52) U.S. Cl.
CPC ...................... *A23J 3/06* (2013.01); *A23G 3/44* (2013.01); *A23J 3/342* (2013.01); *A23K 20/147* (2016.05); *A23K 50/40* (2016.05); *A23L 29/284* (2016.08)

(58) Field of Classification Search
CPC ........... A23J 3/06; A23J 3/342; A23K 20/147; A23K 50/40; A23L 29/284; A23G 3/44
USPC ........................................................... 426/576
See application file for complete search history.

(56) References Cited

U.S. PATENT DOCUMENTS

| | | | | |
|---|---|---|---|---|
| 4,729,897 A | * | 3/1988 | Poppe | ..................... C09H 9/04 426/302 |
| 2017/0086475 A1 | | 3/2017 | Dick et al. | |

FOREIGN PATENT DOCUMENTS

| | | | | |
|---|---|---|---|---|
| JP | S62121729 A | 6/1987 | | |
| JP | S62174231 A | 7/1987 | | |
| JP | 05-186742 | 7/1993 | | |
| JP | 2001181580 A | 7/2001 | | |
| WO | 20040065507 A1 | 8/2004 | | |
| WO | WO-2004065507 A1 | * | 8/2004 | ............... A23J 3/06 |
| WO | 2019122376 A1 | 6/2019 | | |

OTHER PUBLICATIONS

Translation of WO-2004065507-A1 (Year: 2004).*
International Search Report for PCT/EP2020/084236 issued on Jan. 20, 2021.
International Preliminary Report on Patentability for PCT/EP2020/084236 issued on May 17, 2022.
Anonymous: "Gelatine—", RÖMPP Chemie Lexikon, Aug. 1, 2006, retrieved from the internet, https://roempp.thieme.de/roempp4.0/do/data/RD-07-00483.

* cited by examiner

*Primary Examiner* — Brent T O'Hern
(74) *Attorney, Agent, or Firm* — Benjamin D. van der Sman; Hoyng Rokh Monegier B.V.

(57) ABSTRACT

The present invention relates to a composition comprising gelatin and collagen hydrolysate. The composition of the present invention has enhanced properties of ease of use in various applications, especially in food applications, in a wide range of temperatures and has enhanced setting time properties. The present invention further relates to an improved process for making said composition and to uses of said composition in food applications, in pharmaceutical applications, technical and in pet food applications. The present invention is particularly useful in the preparation of food applications such as confectionery products and various types of desserts.

11 Claims, No Drawings

GELATIN COMPOSITION, A PROCESS FOR MAKING SUCH AND USES THEREOF

TECHNICAL FIELD OF THE INVENTION

The present invention relates to a composition comprising gelatin and collagen hydrolysate. The composition of the present invention has enhanced properties of ease of use in various applications, especially in food applications, in a wide range of temperatures and has enhanced setting properties. The present invention further relates to a process for making said composition and to uses of said composition in food applications, in pharmaceutical applications, technical applications and in pet food applications. The present invention is particularly useful in the preparation of food applications such as confectionery products and various types of desserts.

BACKGROUND OF THE INVENTION

The need of consumers for ingredients that are easy to use, that provide the desired results without having to perform too many complicated steps in the preparation process of foods, is increasing. Consumers also prefer to use ingredients that can be used in various applications instead of having to use different ingredients for the preparation of different applications. Thus convenience and ease of use play an important role in the selection of ingredients. Further, consumers are becoming more and more demanding when it comes to the quality of the food they are preparing and eating. One of the quality parameters, especially in food products such as desserts and confectionery products is their texture property. Thus further, consumers want to use ingredients that provide high quality end products.

Not only consumers, but also in the food industry, food producers are looking for ingredients that possess the same property: ease of use, speed of processing and high quality of the end products.

Additionally, another important trend in the food industry is health, clean label ingredients and the use of natural ingredients. As much as possible, food producers and consumers tend to turn away from ingredients that are not perceived as healthy or that have been highly chemically modified.

Many ingredients on the market are used to provide texture to food products. These ingredients may be modified starches, hydrocolloids, additives and the like. Also, a very popular ingredient to provide texture is gelatin. Gelatin is a protein and is a natural product. Gelatin has many benefits that are well known in the art. However, standard gelatin first needs to be dissolved before it can be properly used in the preparation of food products. Dissolving gelatin requires several handling steps and high temperatures, and this is not always very convenient or safe, for example when preparing food with small children. However, gelatin is a protein and therefore contributes positively to the preparation of balanced diets, contrary to the use of certain carbohydrates.

Indeed, protein is an important food ingredient and is needed as part of a balanced diet for building and maintaining body mass. Many individuals nowadays are looking for protein rich diets for different types of reasons. It is however not always easy to find suitable high protein foods, which are healthy, and at the same time have acceptable texture properties. Also on the processing side it can become quite complicated to produce protein rich foods.

There is thus a need in the market for a versatile and easy to use protein ingredient that can enable consumers at home and food and pet food producers to target different food and pet food applications and to provide desired texture properties and, at the same time, to increase the health properties of food and pet food applications.

EP 0 215 690 A1 discloses gelatin particles coated with collagen hydrolysate to improve wettability and dispersibility in aqueous liquids.

WO 2004/0655507 A1 discloses an agglomerated gelatin powder, for use as instant gelatin and a process for its preparation.

JP 2001/181580 relates to a gelatin which is soluble in cold water and has gelling ability and which has enhanced dispersibility by granulation and a method for producing the same.

The present invention aims to provide improved protein ingredient and to solves problems of the prior art.

SUMMARY OF THE INVENTION

In a first aspect, the present invention relates to a composition comprising gelatin and collagen hydrolysate, characterized in that a. the composition comprises agglomerates of particles, which particles comprise gelatin, collagen hydrolysate, or gelatin and collagen hydrolysate, b. wherein at least part of the particles comprise, preferably consist of collagen hydrolysate, and wherein c. collagen hydrolysate is present as a layer between the particles of the agglomerates.

In a second aspect, the present invention relates to a process to produce a composition comprising gelatin and collagen hydrolysate, said process comprising the steps of:

a. Providing particles comprising gelatin, collagen hydrolysate, or gelatin and collagen hydrolysate, wherein at least part of the particles comprise, preferably consist of collagen hydrolysate, and b. Spraying a solution comprising collagen hydrolysate onto the particles of step a. to agglomerate said particles, and c. Performing a drying step, and d. Optionally sieving.

In a third aspect, the present invention relates to the use of the composition of the present invention in the preparation of a food product.

In a fourth aspect, the present invention relates to a process for preparing a food product, comprising using the composition of the present invention with further food ingredients.

In a fifth aspect, the present invention relates to a ready to make food product, comprising a mixture of the composition of the present invention and further food ingredients in dry form.

In a sixth aspect, the present invention relates to the use of the composition of the present invention in the preparation of a technical, pet food or pharmaceutical application.

In a seventh aspect, the present invention relates to a process for preparing technical, pharmaceutical or pet food applications, comprising using the composition of the present invention with further technical, pharmaceutical or pet food ingredients.

DETAILED DESCRIPTION OF THE INVENTION

The present invention is detailed in the appended claims.

In a first aspect, the present invention relates to a composition comprising gelatin and collagen hydrolysate, characterized in that
a. the composition comprises agglomerates of particles, which particles comprise gelatin, collagen hydrolysate, or gelatin and collagen hydrolysate,
b. wherein at least part of the particles comprise, preferably consist of collagen hydrolysate, and wherein
c. collagen hydrolysate is present as a layer between the particles of the agglomerates.

The composition of the present invention comprises agglomerates of particles comprising gelatin, collagen hydrolysate or gelatin and collagen hydrolysate, having a layer of collagen hydrolysate for binding the particles.

Besides the agglomerates of particles, the composition may comprise non-agglomerated components. The non-agglomerated particles may be collagen hydrolysate particles and/or gelatin particles, but may also be other proteins, carbohydrates, vitamins and the like.

Preferably, the composition comprises more agglomerates than non agglomerated particles, more preferably, the composition comprises at least 60 wt % of agglomerates, even more preferably at least 70 wt % of agglomerates, yet even more preferably at least 80 wt % of agglomerates, yet even more preferably at least 90 wt % of agglomerates, yet even more preferably at least 95 wt % of agglomerates, most preferably at least 99 wt % of agglomerates. Thus most preferably, the composition is made up essentially of agglomerates. The composition of the present invention may be referred to as an "agglomerated composition".

Agglomerates are well known in the art and mean that (powder) particles have been processed such as to increase their particle size, in particular particles with an initial particle size are combined or glued together to produce products with a new, larger particle size, an agglomerate. Agglomerates are typically produced by agglomeration process, wherein a liquid binder (water or an aqueous solution comprising a dissolved component) is sprayed onto the particles, creating the agglomeration. When the binder solution is an aqueous solution comprising a dissolved component, the particles within an agglomerate are held together by a layer of said component. A layer means that the component is present between the particles of the agglomerates. Other terms for layer are for example a film, a (partial) coating.

It is understood that in the present invention, at least part of the initial particles may themselves be agglomerates, for example obtained by the process of the present invention or by another process such as for example described in WO 2019/122376 A1. The particle size of the particles may thus be more or less broadly distributed, meaning that particles of various particle sizes may be used to produce the agglomerates, or the particle size of the particles may be narrowly distributed, meaning that the initial particles have a similar particle size. Also, the initial particles may be coated particles, such as for example gelatin particles coated with collagen hydrolysate. Preferably, the components to be agglomerated have a similar particles size and preferably further similar densities.

The particles used may also be of different shapes, i.e. the particles may be granules or flakes and so on. Granules may be spherical granules or non-spherical granules such as produced through compaction for example.

Preferably, gelatin particles (i.e. particles comprising gelatin), comprise at least 50 wt % db (weight % on dry basis), more preferably at least 60 wt % db, even more preferably at least 70 wt % db, yet even more preferably at least 80 wt % db, yet even more preferably at least 90 wt % db, yet even more preferably at least 95 wt % db, yet even more preferably at least 99 wt % db gelatin and yet even more preferably essentially consist of gelatin.

Preferably, collagen hydrolysate particles (i.e. particles comprising collagen hydrolysate), comprise at least 50 wt % db, more preferably at least 60 wt % db, even more preferably at least 70 wt % db, yet even more preferably at least 80 wt % db, yet even more preferably at least 90 wt % db, yet even more preferably at least 95 wt % db, yet even more preferably at least 99 wt % db collagen hydrolysate, yet even more preferably essentially consist of collagen hydrolysate.

Preferably, particles comprising gelatin and collagen hydrolysate may comprise gelatin and collagen hydrolysate in various ratios. Preferably at least 50 wt % db, more preferably at least 60 wt % db, even more preferably at least 70 wt % db, even more preferably at least 80 wt % db, yet even more preferably at least 90 wt % db, yet even more preferably at least 99 wt % db of the particles is made up of collagen hydrolysate and gelatin.

In one preferred embodiment, some particles within the agglomerates comprise gelatin, the other particles within the agglomerates comprise collagen hydrolysate (i.e. the starting material for the agglomeration process comprised gelatin particles and collagen particles). It is also possible that for some agglomerates of the composition, all particles within said agglomerate comprise gelatin and substantially no collagen hydrolysate and/or that for some agglomerates of the composition, all particles within said agglomerate comprise collagen hydrolysate and substantially no gelatin. Further the composition may also comprise some non-agglomerated gelatin particles and/or some non-agglomerated collagen hydrolysate particles, i.e. these particles where not agglomerated during the production process.

In another embodiment, some particles within the agglomerates comprise gelatin, other particles within the agglomerates comprise collagen hydrolysate, and still other particles within the agglomerates comprise both gelatin and collagen hydrolysates (i.e. the starting material for the agglomeration process comprised gelatin particles, collagen particles and agglomerates of gelatin particles and collagen particles). It is also possible that for some agglomerates of the composition, all particles within said agglomerate comprise gelatin and substantially no collagen hydrolysate and/or that for some agglomerates of the composition, all particles within said agglomerate comprise collagen hydrolysate and substantially no gelatin.

In all embodiments of the present invention, all agglomerates comprise collagen hydrolysate present as a layer between the particles of the agglomerates. Thus, in all embodiments of the present invention, during the agglomeration process to produce the agglomerates, collagen hydrolysate is used as the binder that more or less holds the particles of the agglomerates together. It is understood that "used as the binder" means that the liquid binder, preferably the aqueous binder used during agglomeration comprises collagen hydrolysate.

Thus the present invention also relates to a composition comprising gelatin and collagen hydrolysate, characterized in that:
a. the composition comprises agglomerates of particles, which particles comprise gelatin, collagen hydrolysate, or gelatin and collagen hydrolysate, and b. wherein at least part of the particles comprise, preferably consist of collagen hydrolysate, and c. The composition is prepared by providing the particles, and agglomerating said particles using collagen hydrolysate as a binder.

Preferably the composition of the present invention comprises agglomerates of particles, which particles comprise gelatin or collagen hydrolysate.

Preferably the composition of the present invention comprises at least some (10 wt % or more, more preferably 20 wt % or more, more preferably 30 wt % or more, even more preferably 40 wt % or more, yet even more preferably 50 wt % or more) agglomerates comprising 50 wt % or more, more preferably 60 wt % or more, even more preferably 70 wt % or more, yet even more preferably 80 wt % or more, yet even more preferably 90 wt % or more, yet even more preferably 95 wt % and most preferably consisting essentially of collagen hydrolysate.

In one embodiment, the composition of the present invention comprises from 40 to 60 wt %, more preferably from 40 to 55 wt %, yet even more preferably from 40 to 50 wt % of gelatin and from 60 to 40 wt %, more preferably from 60 to 45 wt %, yet even more preferably from 60 to 50 wt % of collagen hydrolysate.

In another embodiment, the composition of the present invention preferably comprises from 60 to 80 wt %, more preferably from 65 to 80 wt %, even more preferably from 65 to 75 wt %, yet even more preferably from 70 to 75 wt % of gelatin and preferably from 20 to 40 wt %, more preferably from 20 to 35 wt %, even more preferably from 25 to 35 wt %, yet even more preferably from 25 to 30 wt % of collagen hydrolysate.

Preferably, the composition having agglomerated particles, has a d50 particle size of from 100 to 1000 µm, more preferably from 100 to 500 µm, even more preferably from 100 to 400 µm, even more preferably from 100 to 300 µm, yet even more preferably from 100 to 250 µm, yet even more preferably from 100 to 200 µm, and is measured by laser diffraction on a Beckman Coulter particle size analyzer using standard software.

Preferably further, the composition of the present invention has a moisture content of from 2 to 12 wt %, more preferably from 3 to 10 wt %, even more preferably from 4 to 7 wt %.

Collagen is the main component of connective tissues in animals and humans. Collagen consists of chains of amino acids wound together to form triple-helices which in turn form elongated fibrils. It is mostly found in fibrous tissues such as tendons, ligaments and skin. It is also found in bones, teeth, corneas, cartilage intervertebral discs and blood vessels. Collagen for industrial processing is mostly derived from skin and/or bones. Collagen may be processed to produce gelatin, which is obtained by irreversible, partial hydrolysis of collagen. According to the Food Chemical Codes, gelatin is defined as the product obtained from the acid, alkaline, or enzymatic hydrolysis of collagen, the chief protein component of the skin, bones, and connective tissues of animals, including fish and poultry. Gelatin is typically characterized by a gelstrenght (Bloom) and in warm solution by a certain viscosity. This gelatin can be further hydrolyzed to shorter protein chains to produce collagen hydrolysate (i.e. gelatin hydrolysate), losing its ability to form a gel and becoming even soluble in water at ambient temperatures. Hydrolysis can be done by an enzymatic treatment for example. Collagen hydrolysate is well known and differs from gelatin in that, amongst other things, it has a smaller molecular weight and it does not have the ability to form a gel but is soluble in water at ambient temperatures.

The gelatin can thus be obtained from a typical industrial process, from collagen containing material such as animal skin, preferably beef hide and/or pork skin and/or fish skin, more preferably from beef hide and/or pork skin; or such as animal bones, preferably from pig bones and/or beef bones and/or fish scales/bones and/or poultry bones, more preferably from pig bones and/or fish scales/bones.

Gelatin is further characterized by its viscosity. Said viscosity may be from 1.5 mPa·s to 7 mPa·s. Viscosity is a well-known gelatin parameter in the art and is measured according to the method detailed below.

Gelatin is further characterized by its Bloom value. The Bloom value may range from 45 g to 300 g. Bloom is a well-known gelatin parameter in the art and is measured according to the method detailed below.

Preferably, the gelatin comprises or consist of cold soluble gelatin, also called instant gelatin. Cold soluble gelatin is amorphous gelatin (partially or fully amorphous, preferably fully amorphous) and can be obtained for example by a specific drying process, preferably by a well-known called drum drying process.

Typically gelatin has an average molecular weight of from 50 k Da to 200 k Da, as measured with gel permeation chromatography analysis.

Preferably gelatin particles have a particle size of from 50 to 500 µm, more preferably from 60 to 400 µm, even more preferably from 70 to 300 µm, yet even more preferably from 80 to 200 µm, yet even more preferably from 80 to 150 µm, yet even more preferably from 80 to 100 µm. Particle size is measured by laser diffraction on a Beckman Coulter particle size analyzer using standard software.

Preferably the collagen hydrolysate has an average molecular weight of from 300 to 15000 Da, preferably from 500 to 10000 Da, further preferably from 600 to 10000 Da, further preferably from 700 to 10000 Da, further preferably from 800 to 10000 Da, further preferably from 900 to 10000 Da, further preferably from 1000 to 10000 Da, further preferably from 1500 to 10000 Da, further preferably from 1700 to 9000 Da, further preferably from 2000 to 7000 Da, further preferably from 2000 to 5000 Da, more preferably from 2500 to 4500 Da, even more preferably from 2700 to 4000 Da, et even more preferably of from 2800 to 3800 Da (average molecular weight (Mw) measured by gel permeation chromatography (Size exclusion chromatography using linear polymers such as polystyrene sulfonates or collagen chain fragments of different molecular weights as calibration vehicles).

Preferably further, collagen hydrolysate particles have a d50 particle size of from 50 to 1000 µm, preferably from 60 to 800 µm, more preferably from 70 to 600 µm, even more preferably from 80 to 500 µm, yet even more preferably from 80 to 400 µm, yet even more preferably from 80 to 300 µm, yet even more preferably from 80 to 250 µm, yet even more preferably from 80 to 250 µm, yet even more preferably from 80 to 200 µm, yet even more preferably from 80 to 150 µm, yet even more preferably from 80 to 100 µm. in the present description, d50 means the particle size where 50% of the volume fraction of the particles is larger than the indicated d50 value, and 50% is smaller than the indicated d50 value. It is measured by laser diffraction on a Beckman Coulter particle size analyzer using standard software.

It has been found that the presence of collagen hydrolysate as a layer between the particles of the agglomerates but also the presence of collagen hydrolysate as particles in the agglomerates allows to produce a composition with enhanced properties compared to prior art compositions, where collagen hydrolysate is only present as a layer between the particles, i.e. where collagen hydrolysate is only used in the binder solution during the agglomeration process. In particular, the ability to form a gel after dissolution in cold liquids is improved.

Further preferably, the composition of the present invention is characterized in that it has a dissolution time of less than 3 minutes, preferably less than 2 minutes, more preferably less than 1 minute in water at 25° C. Preferably, the composition of the present invention has a dissolution time of from 50 to 5 seconds, more preferably of from 40 to 5 seconds, even more preferably from 30 to 5 seconds, yet even more preferably from 20 to 5 seconds, most preferably from 10 to 5 seconds. The method of measuring dissolution time is detailed further below.

Further advantageously, the composition of the present invention has a good dissolution in cold liquids, such as in cold water of 15° C. or less, for example 10° C. or even 5° C. Preferably, the dissolution time in cold water of 10° C. is less than 3 minutes, preferably less than 2 minutes, more preferably less than 1 minute. Preferably, the composition of the present invention has a dissolution time of from 50 to 5 seconds, more preferably of from 40 to 5 seconds, even more preferably from 30 to 5 seconds, yet even more preferably from 20 to 5 seconds, most preferably from 10 to 5 seconds. Also advantageous, even when processed at such cold temperatures, in particular at 10° C., the composition of the present invention still is able to form gel structures.

Particularly advantageous with the composition of the present invention, is that, amongst other things, it is able to dissolve rapidly while still able to form gel structures wherein a reduced amount of air bubbles is present, thus forming gel structures with a more smooth outlook. Typically compositions of the prior art provide gel structures having higher amount of air bubbles which is not desirable in applications such as jellies for example. Also the setting time of the composition of the present invention, i.e. the time needed for a liquid composition to form a gel under specific temperature conditions, is reduced compared to compositions of the prior art, meaning that the composition of the present invention will set faster into a gel compared to compositions of the prior art, particularly after dissolution in cold liquids and more particularly when setting at cold temperatures. Thus, advantageous to the setting time property of the composition of the present invention is that while the setting time is short, it is also sufficient to allow air bubbles to escape from the composition before it has had the opportunity to set completely. This is desirable for many applications that require a smooth appearance, sometimes even a transparent appearance. In particular, this is an advantage in confectionery applications such as jellies, gummies, candies and the like.

Preferably further the composition of the present invention is characterized in that it is able to form a gel when processed according to method A, preferably a gel with strength of at least 3 g, preferably at least 5 g, more preferably at least 8 g, yet even more preferably at least 10 g.

Additionally and alternatively, the present composition also allows to make aerated products, wherein a substantial amount of air is maintained in the product, such as smoothies, mousses and so on.

Further advantageously, the composition of the present invention forms substantially no lumps upon dissolution.

The composition of the present invention is further characterized in that it presents less porosity in the agglomerates compared to compositions of the prior art. Porosity of agglomerates can be quantified for example with electron microscopy.

The composition of the present invention is further characterized in that the agglomerates show a different morphology than the compositions of the prior art, namely in that more particles and thus more agglomerates have a more sharp edged morphology. This morphology can be qualified and quantified for example with electron microscopy.

Other methods to determine the structure of the agglomerates comprise X-ray diffraction, NMR, encapsulation in amorphous silica matrix and atom probe tomography analysis (APT).

Additionally to what is mentioned hereinbefore, the composition of the present invention has the advantage compared to prior art compositions that it has a better wettability (i.e. shorter wettability time).

In a second aspect, the present invention relates to a process to produce an agglomerated composition comprising collagen hydrolysate and gelatin, characterized in that it comprises the steps of:
  a. Providing particles comprising gelatin, collagen hydrolysate or gelatin and collagen hydrolysate, wherein at least part of the particles comprise, preferably consist of collagen hydrolysate, and
  b. Spraying a solution comprising collagen hydrolysate onto the particles of step a. to agglomerate said particles, and
  c. Performing a drying step, and
  d. Optionally sieving.

It has been found that the process of the present invention allows to reduce the agglomeration time and the total processing time compared to processes of the prior art where all collagen hydrolysate is introduced in the binder. In the process of the present invention, the quantity of the aqueous binder needed to agglomerate is reduced, for example two to three times, compared to the quantity of the aqueous binder needed in processes of the prior art.

In step a., the particles comprising gelatin and the particles comprising collagen hydrolysate comprises amounts of gelatin and collagen hydrolysate such that the process allows to produce a composition comprising gelatin and collagen hydrolysate, as mentioned here above. Gelatin and collagen hydrolysate are as defined herein. Both gelatin particles and collagen hydrolysate particles are preferably powders, dry ingredients with a moisture content from 2 to 12 wt %, more preferably from 4 to 10 wt %, even more preferably from 5 to 8 wt %. The particles comprising gelatin and particles comprising collagen hydrolysate of step a. are preferably in the form of a dry blend of said particles. Thus, the dry blend of step a. preferably has a moisture content from 2 to 12 wt %, more preferably from 3 to 10 wt %, even more preferably from 3 to 7 wt %.

Further, the particles of step a. can be agglomerated particles. Preferably, the collagen hydrolysate particles comprise agglomerated collagen hydrolysate particles.

In step b. of the process a solution comprising collagen hydrolysate is sprayed onto the particles of step a. The solution of step b. preferably comprises from 1 to 20 wt % collagen hydrolysate, more preferably from 5 to 15 wt %, even more preferably from 5 to 10 wt % collagen hydrolysate. Spraying may be done by any suitable method such as for example by top spraying through a nozzle in a fluid bed agglomeration system. Spraying the solution comprising collagen hydrolysate in a fluid bed agglomeration system will cause the particles of step a. to agglomerate.

Step c. of the process is a drying step. Drying may be done by any suitable technique, such as air drying. Depending on whether the process of the present invention is a batch or continuous process, the drying method may be adapted. Drying is preferably a gentle drying such as to maintain as much as possible the integrity of the agglomerates and preventing said agglomerates from falling apart in their respective particles. Drying can be done in a batch system by circulating heated air though the fluidized bed after/whilst the binder solution is sprayed in step b. By drying with this technology, product characteristics are more constant, and this drying technology can be fully automated and continuous and is suitable for heat-sensitive products such as proteins. Drying is preferably done until a moisture content of 2 to 12 wt %, preferably 3 to 12 wt %, more preferably 4 to 12 wt %, yet even more preferably 3 to 10 wt %, yet even more preferably 3 to 8 wt %, yet even more preferably 4 to 7 wt % is obtained.

Preferably, oversized material is recycled back or sieved/milled to produce desired particle size.

Preferably, the present invention relates to a composition comprising gelatin and collagen hydrolysate, characterized in that
   a. the composition comprises agglomerates of particles, which particles comprise gelatin, collagen hydrolysate, or gelatin and collagen hydrolysate,
   b. wherein at least part of the particles comprise, preferably consist of collagen hydrolysate, and wherein
   c. collagen hydrolysate is present as a layer between the particles of the agglomerates,
wherein the composition is obtainable by the process of the present invention.

In a further aspect, the present invention relates to the use of the composition of the present invention, in the preparation of a food product as defined below. The composition of the present invention has many advantages for use in the preparation of food products: its flexibility of use in a wide range of temperatures from 5 to 60° C., and in particular in cold liquids (10° C. or less), its speed of use (speed of dissolution and speed of setting for example) that saves time and energy during the preparation process, its versatility of use in different food applications and the like. There is a particular advantage in food systems, which are produced at low temperatures, such as smoothie jellies for examples, i.e. smoothies having a gel-like consistency.

In a further aspect, the present invention relates to a process for preparing a food product, which process comprises using, preferably by dissolving the composition of the present invention and which process comprises combining with further food ingredients. Dissolving the composition of the present invention may be done in water or in any other liquid ingredient used in the preparation of the food product, preferably it is done at cold temperatures (10° C. or less). Combining with further ingredients may be done by mixing, shaking, stirring and the like.

In a particular aspect, the present invention relates to a confectionery product comprising the composition of the present invention and further confectionery ingredients. Ingredients for confectionery products are well-known to the skilled person and are for example carbohydrates, gums, colorants, flavorings, vitamins, and the like. The composition of the present invention is very advantageous in the preparation of confectionery products such as jellies, gummies and candies. Particularly it is possible to produce smooth confectionery products with substantially no air bubbles visible.

In another aspect, the present invention relates to a dessert product comprising the composition of the present invention and further dessert ingredients. Dessert products can be smoothies, cakes, chocolate mousses, fruit mousses, dairy mousses, and the like. Ingredients for dessert products are well-known to the skilled person and are for example carbohydrates, fats and oils, chocolate, milk, cheese, cream, gums, colorants, flavorings, vitamins, and the like.

In a further aspect, the present invention relates to a ready to make food product, comprising a mixture of the composition of the present invention and further food ingredients in dry form. Such ready to make food product may for example be a dry mix for preparing smoothies, beverage shakes and so on wherein the ready to make food product is typically combined by the consumer with a liquid product to prepare a consumable food product.

In a further aspect, the present invention relates to the use of the composition of the present invention in the preparation of a technical application (such as laundry pouches, coating film, food coatings and the like), pet food (such as kibbles, dry or wet pet food) or pharmaceutical application (such as tablets, capsules and the like).

In a further aspect the present invention relates to a process for preparing a technical, pet food or pharmaceutical application, which process comprises using, preferably by dissolving the composition of the present invention and which process comprises combining with further technical, pet food or pharmaceutical ingredients. Dissolving the composition of the present invention may be done in water or in any other liquid ingredient used in the preparation of the technical, pet food or pharmaceutical application, preferably it is done at cold temperatures. Combining with further ingredients may be done by mixing, tableting, extruding, shaking, stirring and the like.

Measurement Methods

Measurement methods referred to in the present description are detailed below: Dissolution time: 10 g of powder is put in a beaker containing 500 ml of water at 25° C., which is stirred with a magnetic stirrer. The dissolution time corresponds to the time needed for the powder to be fully dissolved i.e. substantially no particles are visible with the naked eye.

Cold dissolution time is the dissolution time as described above, measured in water at 10° C.

Wettability time: 10 g of powder is put in a beaker containing 500 ml of water at 25° C., which is not stirred. The wettability time corresponds to the time needed for the powder to sink to the bottom of the beaker. Substantially no powder remains on the surface of the water also no foaming is taking place during the sinking of the powder.

The Bloom value is the mass in grams necessary to depress a standard plunger 4 mm into the gel having a concentration of 6.67% and matured at 10.0° C. for 17 h. A 6.67% solution of the gelatin sample is prepared in a wide-mouthed test bottle at 60° C., cooled to 10° C. and kept for 17 h for maturation at this temperature. The resulting gel is tested using a gelometer according to the GME Monograph Standardised Methods for the Testing of Edible Gelatine (version 12, May 2017).

The viscosity is measured according to British Standard at 6.66%, 60° C. and is expressed in mPa·s. It is measured as described in the GME Monograph Standardised Methods for the Testing of Edible Gelatine (version 12, May 2017).

Gel Strength Measurement

Gel strength is measured using a Texture Analyser Brookfield Ct3. The gel strength is the force, expressed in grams, necessary to depress by 4 mm the surface of a gel with a 1 inch diameter cylinder probe, at a testing speed of 1 mm/sec.

Method A: 75 g of a premix comprising 20 wt % of the composition of the present invention, 75.7 wt % of fine sugar 50, 2.3 wt % of citric acid and 2 wt % of sodium citrate is added to 500 ml of water at 10° C. and dissolved with a hand whisk. The preparation is put in a settl cup 50 ml and placed in the fridge for 120 minutes. The gel strength of the preparation is then measured as described herein.

The present invention will be illustrated in the following non-limiting examples.

EXAMPLES

Example 1: Process

Agglomeration process is performed in GPCG15 with top spray insert. The process is a batch process. The starting material is placed over a bottom sieve with 100 μm mesh width. The starting material particles are fluidized by an air current directed upwards, which passes the bottom sieve. In the middle above the fluidized bed, the nozzle is placed, which atomizes the spraying liquid directed downward against the main air current.

10.8 kg of collagen hydrolysate and amorphous gelatin is used as starting material in a ratio 50/50. The spraying liquid (binder) is a 15% solution of collagen hydrolysate, of which 1.2 kg is used to perform agglomeration of the starting material.

Example 2: Process

Two Agglomeration Trials are Performed:

In a comparative trial, the start material is amorphous gelatin. Collagen hydrolysate is used entirely in de binder. The ratio gelatin/collagen hydrolysate is 50/50. In another trial, the start material is a dry blend of amorphous gelatin and collagen hydrolysate (with a ratio of 50/50). The ratio of gelatin/total collagen hydrolysate is The process is performed as follows: the binder is produced by dissolving the collagen hydrolysate in tap water. The binder is then sprayed onto the start material, the binder has a temperature of 50-55° C.

Agglomeration is performed in GPCG15 with top spray insert. The process is a batch process. The starting material is placed over a bottom sieve with 100 μm mesh width. The starting material particles are fluidized by an air current directed upwards, which passes the bottom sieve. In the middle above the fluidized bed, the nozzle is placed, which atomizes the spraying liquid directed downward against the main air current.

The trials are further detailed in the table below:

|  | Comparative trial | Trial according to the present invention |
|---|---|---|
| Start product | Gelatin/collagen hydrolysate (50/50) | Gelatin |
| Start product mass (g) | 1500 | 1000 |
| Binder | Collagen hydrolysate (20 wt %) + tap water (80 wt %) | Collagen hydrolysate (40 wt %) + tap water (60 wt %) |
| Binder quantity (g) | 750 | 2500 |
| Spray rate (g/min) | 9-20 | 10-23 |
| Spraying time (min) | 41 | 121 |
| Total process time (min) | 53 | 133 |

Example 3: Jelly Dessert

The following premix is used to produce jelly desserts
20 wt % of a composition comprising gelatin and collagen hydrolysate in a ratio 50/50
75.7 wt % of fine sugar S0
2.3 wt % of citric acid
2 wt % of sodium citrate Two Trials are Made:

In a comparative trial the composition comprising gelatin and collagen hydrolysate is produced according to WO2004065507, i.e. all the collagen hydrolysate is brought into solution and sprayed onto the gelatin for agglomeration.

In another trial, a composition according to the present invention is produced, i.e. part of the collagen hydrolysate (5 wt %) is brought into solution and sprayed to agglomerate a dry blend of gelatin and the remaining part of collagen hydrolysate.

75 g of the premix is added to 500 ml of water at 10° C. and dissolved with a hand whisk. The preparations are put in steel cups (50 ml) and placed in the fridge. After 120 minutes the cups are removed from the fridge and gel strength is measured as described herein.

The comparative trial did not gel, no results were obtained with the Texture Analyser.

The trial according to the present has a gel strength of 8 g.

The invention claimed is:

1. A composition comprising gelatin and collagen hydrolysate, wherein:
    the composition comprises agglomerates of particles, which agglomerates comprise particles consisting of collagen hydrolysate, and which agglomerates further comprise at least one of: particles comprising gelatin and particles comprising gelatin and collagen hydrolysate, and
    wherein collagen hydrolysate is present as a layer between the particles of the agglomerates.

2. The composition of claim 1, wherein some of the particles are granules and some of the particles are flakes.

3. The composition of claim 1, wherein the particles are flakes.

4. The composition of claim 1, wherein the composition has a dissolution time in water of 10° C. of less than 3 minutes, wherein the dissolution time is measured by putting 10 g of powder in a beaker containing 500 ml of water at 10° C., which is stirred with a magnetic stirrer, and the dissolution time corresponds to the time needed for the powder to be fully dissolved such that substantially no particles are visible with the naked eye.

5. The composition of claim 1, wherein the composition comprises from 40 to 80 wt % on dry weight basis of the gelatin and from 20 to 60 wt % on dry weight basis of the collagen hydrolysate.

6. The composition of claim 1, wherein the gelatin comprises or consists of amorphous gelatin.

7. The composition according to claim 1, wherein the composition is prepared by providing the particles, and agglomerating said particles using collagen hydrolysate as a binder.

8. The composition according to claim 4, wherein the dissolution time in water of 10° C. is less than 1 minute.

9. A process to produce the composition according to claim 1, the process comprising:

providing particles comprising gelatin, collagen hydrolysate, or gelatin and collagen hydrolysate, wherein at least some of the particles consist of collagen hydrolysate, and spraying a solution comprising collagen hydrolysate onto the particles to agglomerate said particles, and performing a drying step, and optionally sieving.

10. A process for preparing a food product, or a technical, pet food or pharmaceutical composition, which process comprises using the composition of claim 1, and which process comprises combining with further food, technical, pet food or pharmaceutical ingredients.

11. The process according to claim 9, wherein the at least some of the particles consist of collagen hydrolysate.

* * * * *